United States Patent
Nguyen (10) Patent No.: US 11,098,829 B2
(45) Date of Patent: Aug. 24, 2021

(54) SWIVEL JOINT

(71) Applicant: Cantex International, Inc., Houston, TX (US)

(72) Inventor: Duy D. Nguyen, Cypress, TX (US)

(73) Assignee: Cantex International, Inc., Houston, TX (US)

( * ) Notice: Subject to any disclaimer, the term of this patent is extended or adjusted under 35 U.S.C. 154(b) by 208 days.

(21) Appl. No.: 16/151,114

(22) Filed: Oct. 3, 2018

(65) Prior Publication Data

US 2020/0109804 A1 Apr. 9, 2020

(51) Int. Cl.
*F16L 27/08* (2006.01)
*E21B 43/16* (2006.01)
*E21B 43/26* (2006.01)

(52) U.S. Cl.
CPC .......... *F16L 27/0832* (2013.01); *E21B 43/16* (2013.01); *E21B 43/26* (2013.01); *F16L 2201/40* (2013.01)

(58) Field of Classification Search
CPC ............... F16L 27/0832; F16L 2201/40; F16L 27/0828; E21B 43/16; E21B 43/26
See application file for complete search history.

(56) References Cited

U.S. PATENT DOCUMENTS

| 3,727,950 A | 4/1973 | Swanson |
| 3,967,842 A | 7/1976 | Kendrick |
| 3,997,198 A * | 12/1976 | Linder ................ F16L 27/0832 285/98 |
| 4,221,408 A | 9/1980 | Lochte et al. |
| 4,234,216 A | 11/1980 | Swanson et al. |
| 4,236,727 A | 12/1980 | Herbert et al. |
| 4,354,698 A * | 10/1982 | Linder ................ F16L 27/0832 285/272 |
| 4,693,500 A | 9/1987 | Anderson et al. |
| 4,930,791 A | 6/1990 | Ungchusri |
| 5,149,148 A | 9/1992 | Taeuber et al. |

(Continued)

FOREIGN PATENT DOCUMENTS

| CA | 2982276 A1 * | 4/2019 | .......... F16L 27/0828 |
| JP | 2004/293722 A2 | 10/2004 | |

OTHER PUBLICATIONS

Macrotech Polyseal, Inc., *The Extended Range Hydraulic Seal Line* (Mar. 1996).

(Continued)

*Primary Examiner* — James M Hewitt, II
(74) *Attorney, Agent, or Firm* — Keith B. Willhelm (57) ABSTRACT

Swivel joints comprise a male sub, a female sub, annular races, ball bearings, a replaceable sleeve, and first and second pressure seals. The male sub is rotationally coupled to the female sub at, respective, generally tubular joint ends thereof. A passage extends through the subs. The female joint end and male joint end are rotationally coupled by ball bearings in the annular races. The replaceable sleeve is received in enlarged inner diameter portions of the male joint end and the female joint end. The first pressure seal ring is mounted between the replaceable sleeve and the enlarged diameter portion of the male joint end. The second pressure seal ring is mounted between the replaceable sleeve and the enlarged diameter portion of the female joint end.

37 Claims, 7 Drawing Sheets

(56) References Cited

U.S. PATENT DOCUMENTS

| | | | |
|---|---|---|---|
| 5,269,572 A * | 12/1993 | Mefferd | E21B 17/046 |
| | | | 285/330 |
| 5,624,124 A | 4/1997 | Ungchusri et al. | |
| 5,931,476 A | 8/1999 | Ungchusri et al. | |
| 6,164,707 A | 12/2000 | Ungchusri et al. | |
| 6,386,595 B1 | 5/2002 | Peppel | |
| 2013/0049357 A1 | 2/2013 | Harr et al. | |
| 2017/0089499 A1 | 3/2017 | Harr | |
| 2018/0164904 A1 | 6/2018 | Qiao et al. | |
| 2019/0137019 A1* | 5/2019 | Nowell | E21B 17/05 |

OTHER PUBLICATIONS

S.P.M. Flow Control, Inc., *Swivels (Standard and $H_2S$ Service) Operation Instruction and Service Manual* (© 2014).
S.P.M. Flow Control, Inc., *Weir SPM® Flow Control Product Safety, Usage and Maintenance Guide* (Oct. 18, 2016).
S.P.M. Flow Control, Inc., *Weir SPM® Flow Control Products Catalog* (Apr. 26, 2016).
Tech-Seal International, *Swivel Operation and Maintenance Manual* (Jan. 22, 2016).

* cited by examiner

SWIVEL JOINT

FIELD OF THE INVENTION

The present invention relates in general to flowline components for temporary pipe and flow line installations, and especially, components that incorporate a swivel joint that may be used in high-pressure flow lines common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. The fluid serves to lubricate the bit. The drilling mud also carries cuttings from the drilling process back to the surface as it travels up the well bore. As drilling progresses downward, the drill string is extended by adding more pipe sections or "joints."

When the drill bit has reached the desired depth, larger diameter pipes, or casing, are placed in the well and cemented in place to prevent the sides of the borehole from caving in. The well may be extended by drilling additional sections and installing large, but somewhat smaller pipes, or liners. The liners also are typically cemented in the bore. The liner may include valves, or it may then be perforated. In either event, openings in the liner are created through which oil can enter the cased well. Production tubing, valves, and other equipment are installed in the well so that the hydrocarbons may flow in a controlled manner from the formation, into the lined well bore, and through the production tubing up to the surface for storage or transport.

Moreover, hydrocarbons are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations that are relatively nonporous.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

A formation rarely will be fractured all at once. It typically will be fractured in many different locations or zones and in many different stages. Fluids will be pumped into the well to fracture the formation in a first zone. Typically, the first zone will be at the bottom or "toe" of the well. After the initial zone is fractured, pumping is stopped, and a plug is installed or otherwise established in the liner at a point above the fractured zone. Pumping is resumed, and fluids are pumped into the well to fracture the formation in a second zone located above the plug. That process is repeated for zones further up the formation until the formation has been completely fractured.

Once the well is fractured, large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Figure 1:
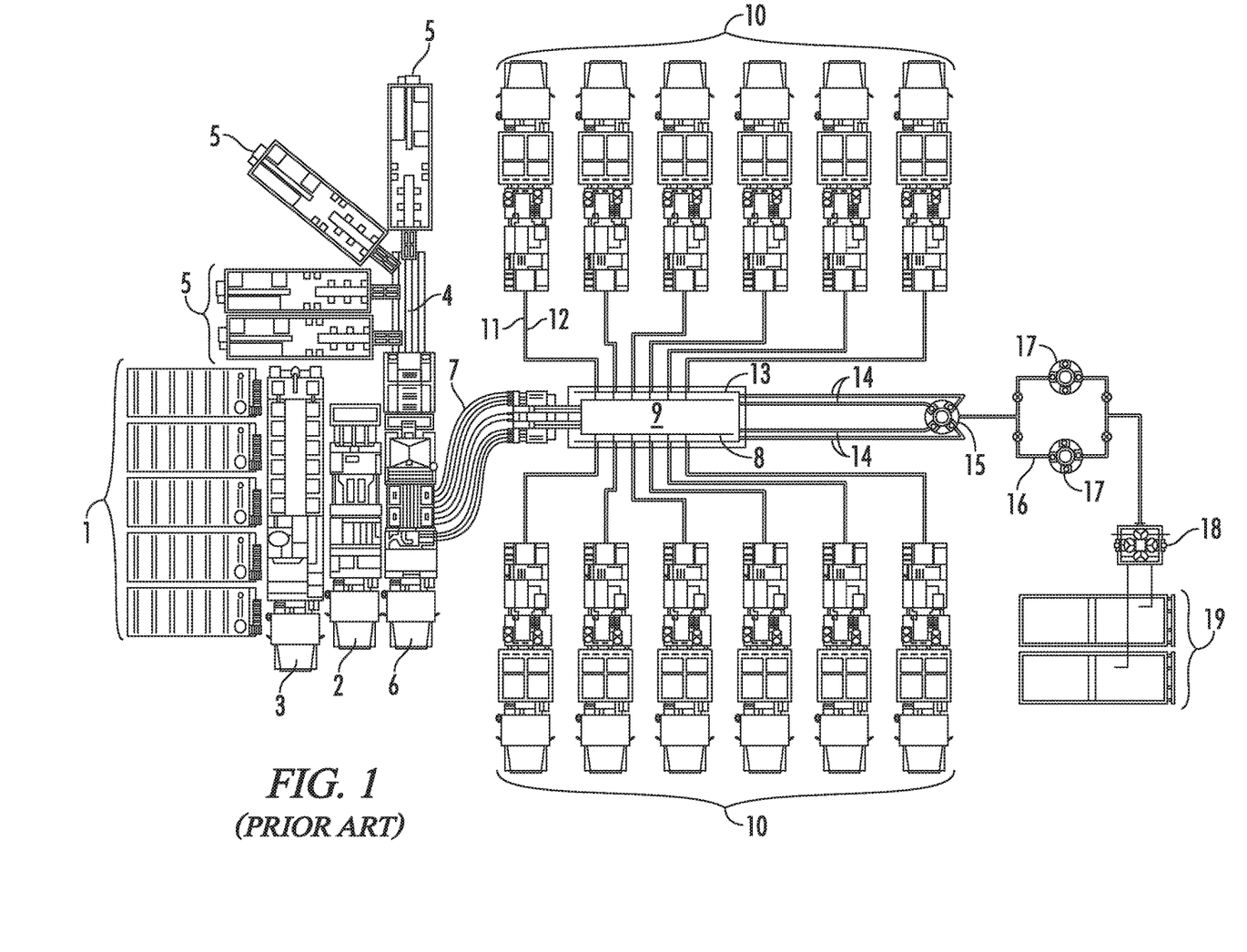
FIG. 1 (prior art) is a schematic view of a system for fracturing a well and receiving flowback from the well, which system includes various high-pressure flow lines, such as flow lines 12 and 14.

Systems for successfully completing a fracturing operation, therefore, are extensive and complex, as may be appreciated from FIG. 1. FIG. 1 illustrates schematically a common, conventional frac system. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17 which control flow into and out of the well. Once fracturing is complete, flow back from the fracturing operation discharges into a flowback manifold 18 which leads into flowback tanks 19.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, that operate under relatively low pressures. The high side includes all the components downstream of the discharge outlets of pumps 10, e.g., the high-pressure missiles 13 of frac manifold 9 and flow lines 14 running to goat head 15, that operate under relatively high pressures.

The larger units of a frac system are transported to a well site on skids, trailers, or trucks and then connected by one kind of conduit or another. The conduits on the low-pressure side typically will be flexible hoses, such as blender hoses 7 and suction hoses 11. On the other hand, flow lines 14 running to goat head 15 and other high-pressure side conduits will be subject to extremely high pressures. They must be more rugged. Typically, they will be rated for 10,000 psi or higher, such as 15,000 psi. They also typically will be assembled on site.

Flow lines 14 and other portions of the high-side that are assembled on site are made up from a variety of components often referred to as "frac iron," "flow iron," or "ground iron." Such components include sections of straight steel pipe, such as pup joints. They also include various fittings, such as tees, crosses, laterals, and wyes, which provide junctions at which flow is split or combined. In addition to junction fittings, flow line components include fittings that are used to alter the course of a flow line. Such directional fittings include elbows and swivel components, that is, components that have a swivel joint allowing parts of the component to rotate relative to each other. High-pressure flow lines also incorporate gauges and other monitoring equipment, as well as control devices such as shut off, plug, check, throttle, pressure release, butterfly, and choke valves.

Because frac systems are required at a site for a relatively short period of time, frac iron components often are joined by unions. Unions allow the components to be connected ("made up") and disconnected ("broken down") relatively quickly. The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

It will be appreciated, however, that a well head is fixed. Skidded units can be quite large, heavy, and moveable only with difficulty and limited precision. Flow lines, therefore, necessarily incorporate directional fittings, such as elbows, that allow its course to be altered to accommodate two unaligned units. Invariably they also require swivel components.

A very common swivel component is an assembly of elbow conduits, usually three, connected by rotatable joints or "swivel joints." The joints are packed with bearings, typically ball bearings, that allow the elbow conduits to rotate relative to each other. The swivel component, therefore, can accommodate varying degrees of misalignment between other flowline components and can provide considerable flexibility in assembling a flow line between essentially immovable points.

Figure 2:
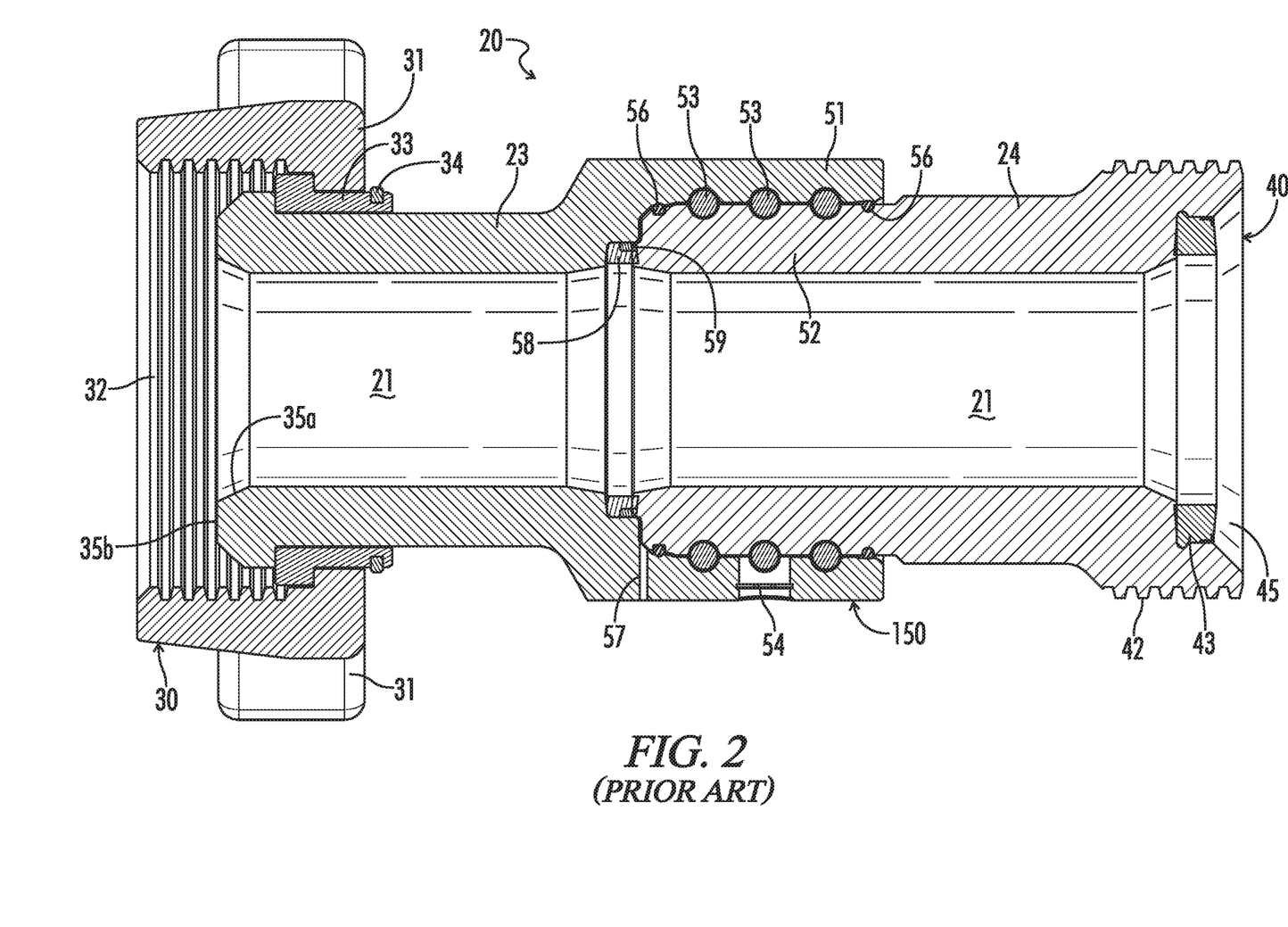
FIG. 2 (prior art) is a cross-sectional view of a prior art high-pressure swivel component 20 incorporating a prior art swivel joint 50.

A common swivel joint design is shown in FIG. 2. FIG. 2 shows a relatively short, conventional pup joint 20 that can swivel. Swivel pup 20 has a pair of tubular subs, female sub 23 and male sub 24 that are connected by a conventional swivel joint 50. A central passage 21 extends along the main axis of swivel pup 20. Swivel joint 50 allows female sub 23 and male sub 24 to rotate relative to each other about the axis.

Female sub 23 and male sub 24 are each provided with connections that allow them to be assembled into a high-pressure flowline. In particular, female sub 23 is provided with a male hammer union connection 30, and male sub 24 is provided with a female hammer union connection 40. Male hammer union connection 30 comprises a connection end of female sub 23, a plurality of retainer segments 33, and a lug nut 31. Female hammer union connection 40 comprises a connection end of male sub 24 and an annular elastomer seal 43. Swivel pup 20, therefore, may be assembled into a flow line by hammer unions.

More particularly, lug nut 31 of male hammer union connection 30 on female sub may be threaded on to a female hammer union connection on another flowline component. Inner threads 32 on lug nut 31 will engage outer threads on the female hammer union connection of the other component. Once male hammer union connection 30 of swivel pup 20 initially contacts the female hammer union connection of the other component, further tightening of lug nut 31 will generate axial compressive forces between female sub 23 and the other flowline component.

Conventional swivel joint 50 generally comprises a joint end 51 of female sub 23, a joint end 52 of male sub 24, a plurality of bearings 53, and an elastomer seal 58. As shown in FIG. 2, male joint end 52 is received in female joint end 51 and is rotationally coupled by bearings 53. More specifically, joint end 51 of female sub 23 is provided with an area of enlarged inner diameter (relative to the diameter of passage 21) such that male joint end 52 will fit closely within female joint end 51. The terminus of male joint end 52 will abut a shoulder extending radially between the nominal inner diameter of female sub 23 and the enlarged inner diameter portion of female joint end 51.

Mating annular grooves are provided in female joint end 51 and male joint end 52. More particularly, three internal annular grooves are provided in the enlarged inner diameter portion of female joint end 51, and three external annular grooves are provided on the male joint end 52. Each of those grooves has a substantially semicircular cross-section. When male joint end 52 is received in female joint end 51 the grooves will be in substantial alignment and cooperate to form bearing raceways extending all the way around the interface between male joint end 52 and female joint end 51.

Bearings 53 may be loaded into the raceways via access ports. Once loaded into the raceways, bearings 53 provide a rotatable coupling between female joint end 51 and male joint end 52. Bearings 53 allow joint ends 51/52 to rotate relative to each other, while at the same time preventing them from separating.

Elastomer seal 58 is a face seal ring that is carried within a rabbet provided in the shoulder in female joint end 51. It typically will be backed up by anti-extrusion rings, such as backup rings 59. Once coupled by bearings 53, elastomer seal 58 is compressed between the terminus of male joint end 52 and the shoulder in female joint end 51. Elastomer seal 58, therefore, is able to seal and isolate the swivel joint 50 connecting female sub 23 and male sub 24 from hydraulic pressure within passage 21.

The basic design of swivel joints as exemplified by swivel joint 50 of swivel pup 20 has been widely adopted, especially for use in high-pressure flow lines used in oil and gas frac systems. Nevertheless, swivel components are exposed to extremely harsh operating conditions. Fluids passing through them often are corrosive and commonly contain entrained particulates. They may be pumped at extremely high rates and pressures. Flow may be quite turbulent and typically creates vibrational bending forces in a flow line. Frac jobs also have become more extensive, both in terms of the pressures required to fracture a formation and the time required to complete all stages of an operation. Thus, wear and leakage of swivel joints is an ongoing issue.

The statements in this section are intended to provide background information related to the invention disclosed and claimed herein. Such information may or may not constitute prior art. It will be appreciated from the foregoing, however, that there remains a need for new and improved high-pressure flowline unions and methods for connecting flowline components. Such disadvantages and others inherent in the prior art are addressed by various aspects and embodiments of the subject invention.

SUMMARY OF THE INVENTION

The subject invention, in its various aspects and embodiments, relates generally to swivel joints and swivel components incorporating those joints, and especially swivel joint and swivel components for high-pressure flow unions. The invention encompasses various embodiments and aspects, some of which are specifically described and illustrated herein. As will be appreciated from the detailed description below, various embodiments provide features that are designed to improve the reliability, service life, and serviceability of the swivel joint.

Broad embodiments of the novel swivel joints may comprise a swivel joint for a high-pressure flow line. The swivel joint comprises a male sub, a female sub, annular races, ball bearings, a replaceable sleeve, and first and second pressure seals. The male sub is rotationally coupled to the female sub at, respective, generally tubular joint ends thereof. A passage extends through the subs. The male sub has an enlarged inner diameter portion of the passage and an outer annular groove. The female sub has an enlarged inner diameter portion of the passage and an inner annular groove. The male joint end is received in the female joint end such that the male joint end groove and the female joint end groove are aligned to provide an annular race. The ball bearings are received in the race. The bearings provide the rotational coupling between the male sub and the female sub. The replaceable sleeve is received in the enlarged inner diameter portions of the male joint end and the female joint end. The first pressure seal ring is mounted between the replaceable sleeve and the enlarged diameter portion of the male joint end. The second pressure seal ring is mounted between the replaceable sleeve and the enlarged diameter portion of the female joint end.

Other embodiments of the novel swivel joints comprise a debris seal ring mounted between the replaceable sleeve and the enlarged diameter portion of the male joint end and a debris seal ring mounted between the replaceable sleeve and the enlarged diameter portion of the female joint end.

Still other embodiments provide swivel joints where the pressure seal rings are radial seals mounted between the outer circumference of the replaceable sleeve and the inner circumference of the enlarged diameter portions and where the pressure seal rings are radial seals mounted in annular glands extending around the outer circumference of the replaceable sleeve.

Additional embodiments provide swivel joints where the debris seal rings are face seals spaced radially inward from the passage and where the debris seal rings are mounted in annular glands extending around faces of the replaceable sleeve.

Yet other embodiments provide swivel joints where at least one of the first and second pressure seal rings is a rotary seal and where the rotary seal ring is a u-cup seal.

Further embodiments provide swivel joints comprising a backup ring mounted behind the rotary seal ring and where the rotary seal ring comprises an integral backup ring.

Other embodiments provide swivel joints where one of the first and second pressure rings is a rotary seal and the other is a static seal.

Still other embodiments provide swivel joints comprising a pair of the first pressure seals and a pair of the second pressure seals.

Addition embodiments provide swivel joints where the sleeve is fabricated from a more wear resistant steel than the steel from which male and female subs are fabricated.

Other aspects and embodiments of the subject invention are directed to swivel flowline components comprising a novel swivel joint and where the component is rated for 10,000 psi service or 15,000 psi service.

Still other embodiments of the subject invention are directed to novel high-pressure flow line comprising the novel swivel components, and where the novel swivel components and flow lines are incorporated into a system for fracturing a well.

In other embodiments and aspects, the subject invention provides methods for assembling flow lines and fluid transportation systems and coupling first and second flowline components. The method comprises assembling a novel swivel flowline component into the flow line and between the first and second flowline components.

Finally, still other aspect and embodiments of the invention will have various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the way it may be practiced. The subject invention encompasses other embodiments consistent with the claims set forth herein.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The subject invention, in various aspects and embodiments, is directed generally to swivel joints that allow parts of a flowline component to rotate relative to each other, and especially to swivel joints that are suitable for high-pressure flowlines. Various specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

The novel swivel joints may be incorporated into components that typically are used to assemble temporary pipe and flow line installations. Those swivel components are particularly useful for temporary installations that must be assembled and disassembled on site and that require a flowline to be assembled between relatively fixed locations. Such flow lines are common in chemical and other industrial plants, on marine dredging vessels, strip mines, and especially in the oil and gas industry.

Frac systems, such as those shown in FIG. 1, are a very common application where swivel components are a practical necessity. The novel swivel components can provide flexibility in accommodating required changes in the course of a flow line, and in connecting fixed or difficult to move equipment, especially on the high-pressure side of a frac system or well. Such equipment might include manifolds, such as frac manifold 9 shown in FIG. 1, pumps 10, goat head 15, zipper manifold 16, trash collectors, and sand separators.

Figure 3:
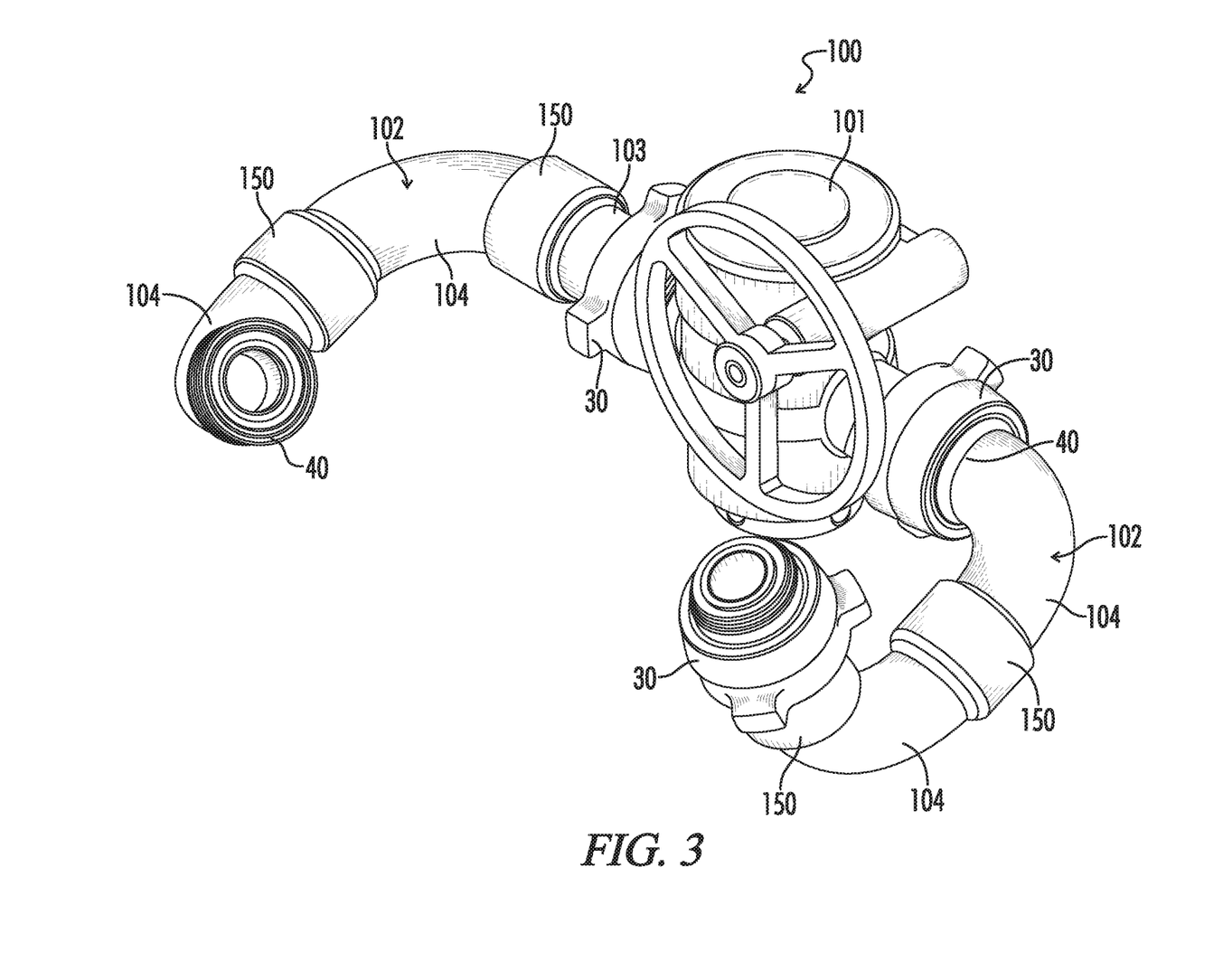
FIG. 3 is an isometric view of a flowline subassembly 100 that may be incorporated, for example, into high-pressure flow lines 12 and 14 of the frac system shown in FIG. 1. Flowline subassembly incorporates a first preferred embodiment 102 of the novel swivel components that in turn incorporates a first embodiment 150 of the novel swivel joints.

For example, FIG. 3 illustrates a subassembly 100 that may be incorporated into a high-pressure flow line of a frac system, such as high-pressure flow lines 14 of the frac system shown in FIG. 1. High-pressure subassembly 100 comprises a plug valve 101 and a pair of swivel components 102. Swivel components 102 comprise relatively short, straight pipe sections 103 and elbows 104. Straight sections 103 and elbows 104 are connected by a first preferred embodiment of the novel swivel joints 150. As described in further detail below, joints 150 are packed with bearings that allow straight sections 103 and elbows 104 to swivel or rotate relative to each other.

Plug valve 101 and swivel components 102 are connected by hammer unions. Plug valve 101 has a male hammer union connection 30 on one side and a female hammer union connection 40 (not visible) on the other side. Similarly, swivel components 102 have a male hammer union connection 30 and a female hammer union connection 40 on opposite ends. Plug valve 101 and swivel components 102 have been assembled by bringing their respective male 30 and female connections 40 together and tightening a lug nut. One swivel component 102 has an open male connection 30, and the other has an open female connection 40. Subassembly 100, therefore, may be assembled into a flow line in a similar fashion.

Swivel component 102 illustrated in FIG. 3, and other flowline components incorporating elbows, perhaps most commonly come to mind in referencing a "swivel joint." As will be appreciated from the discussion that follows, however, the term has a broader meaning as including a variety of flowline components that incorporate a "swivel joint," that is, a joint that swivels. Such components do not necessarily incorporate an elbow. Thus, as used herein, "swivel component" shall be used to refer to flowline components that comprise a joint that allows relative rotation between at least two parts of the component. "Swivel joint" or simply "joint" will refer to the joint within a swivel component that allows swiveling between its parts.

Some broader embodiments of the novel swivel joints have a male sub having a generally tubular joint end and a female sub having a generally tubular joint end. The male and female subs are rotationally coupled their joint ends and define a passage extending through the joint. The male joint end has an enlarged inner diameter portion of the passage and one or more outer annular grooves. The female joint end has an enlarged inner diameter portion of the passage and one or more inner annular grooves. The male joint end is received in the female joint end such that the male joint end grooves and the female joint end grooves are aligned to provide one or more annular races. A plurality of ball bearings is received in the races. The bearings provide the rotational coupling between the male sub and the female sub. A replaceable sleeve is received in the enlarged inner diameter portions of the male joint end and the female joint end. One or more first pressure seal rings are mounted between the replaceable sleeve and the enlarged diameter portion of the male joint end. One or more second pressure seal rings are mounted between the replaceable sleeve and the enlarged diameter portion of the female joint end.

Figure 4:
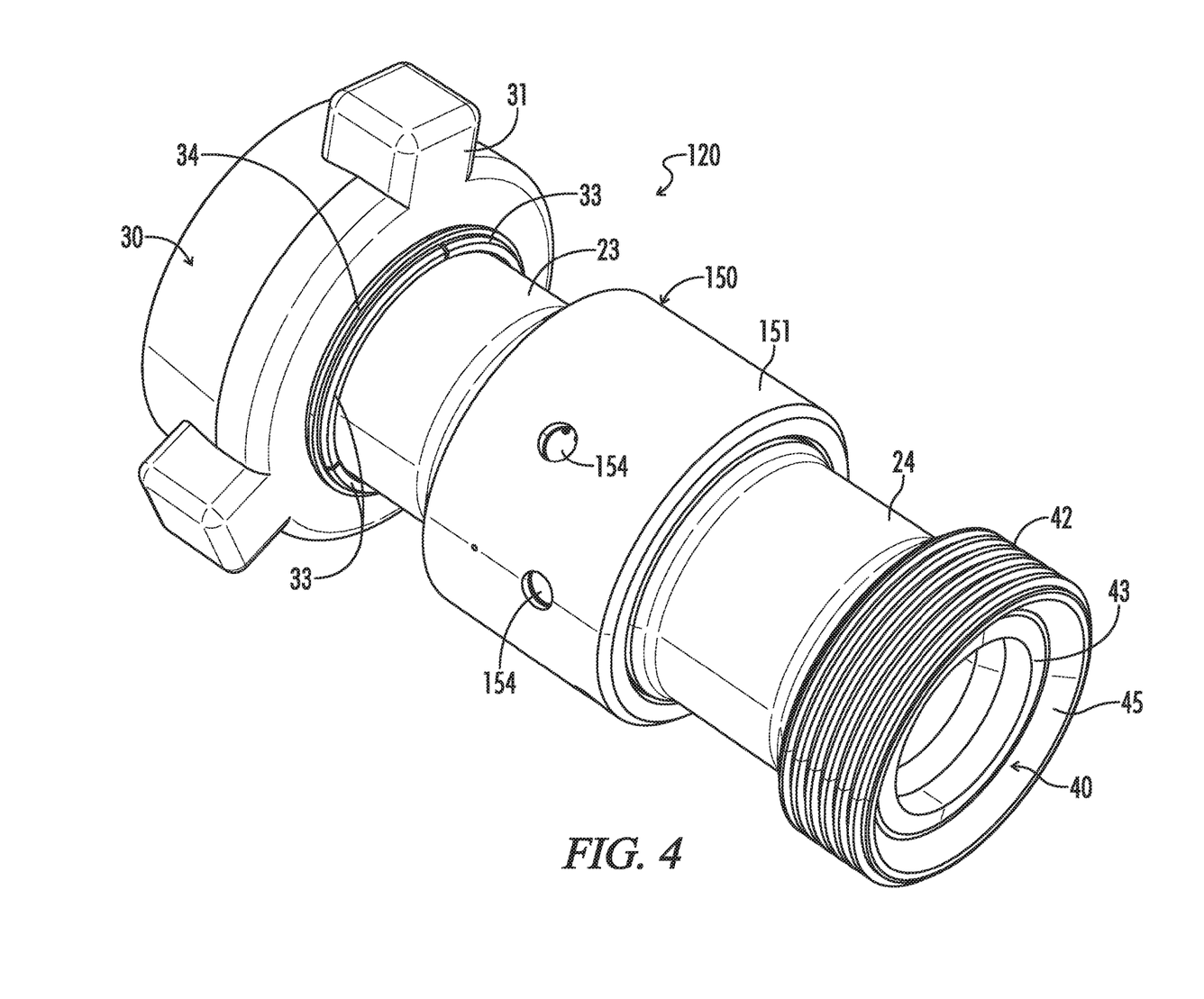
FIG. 4 is an isometric view of a second preferred embodiment 120 of the novel swivel components, namely a swivel pup joint. Swivel pup joint 120 incorporates novel swivel joint 150.
Figure 5:
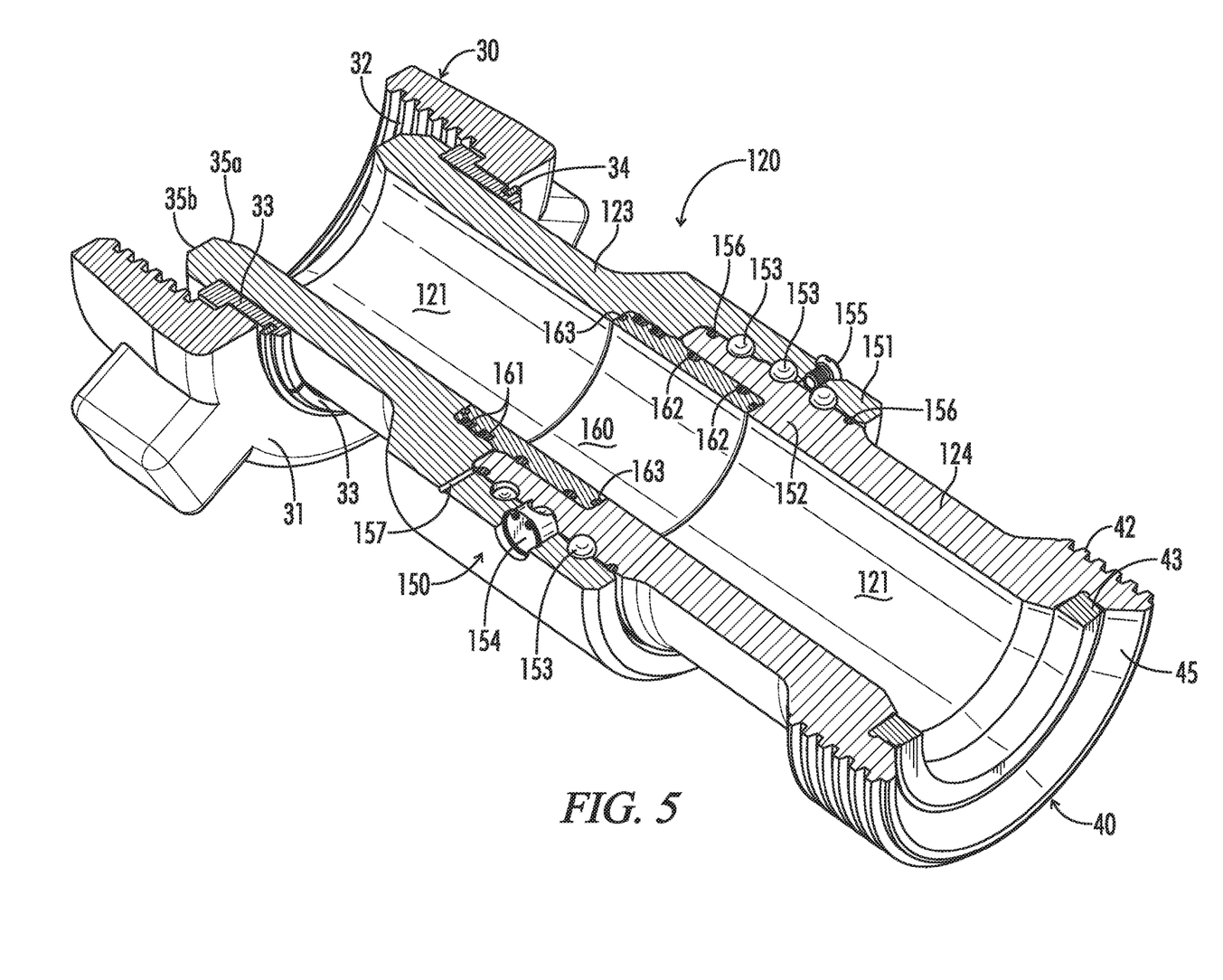
FIG. 5 is an isometric cross-sectional view of swivel pup joint 120 shown in FIG. 4.
Figure 6:
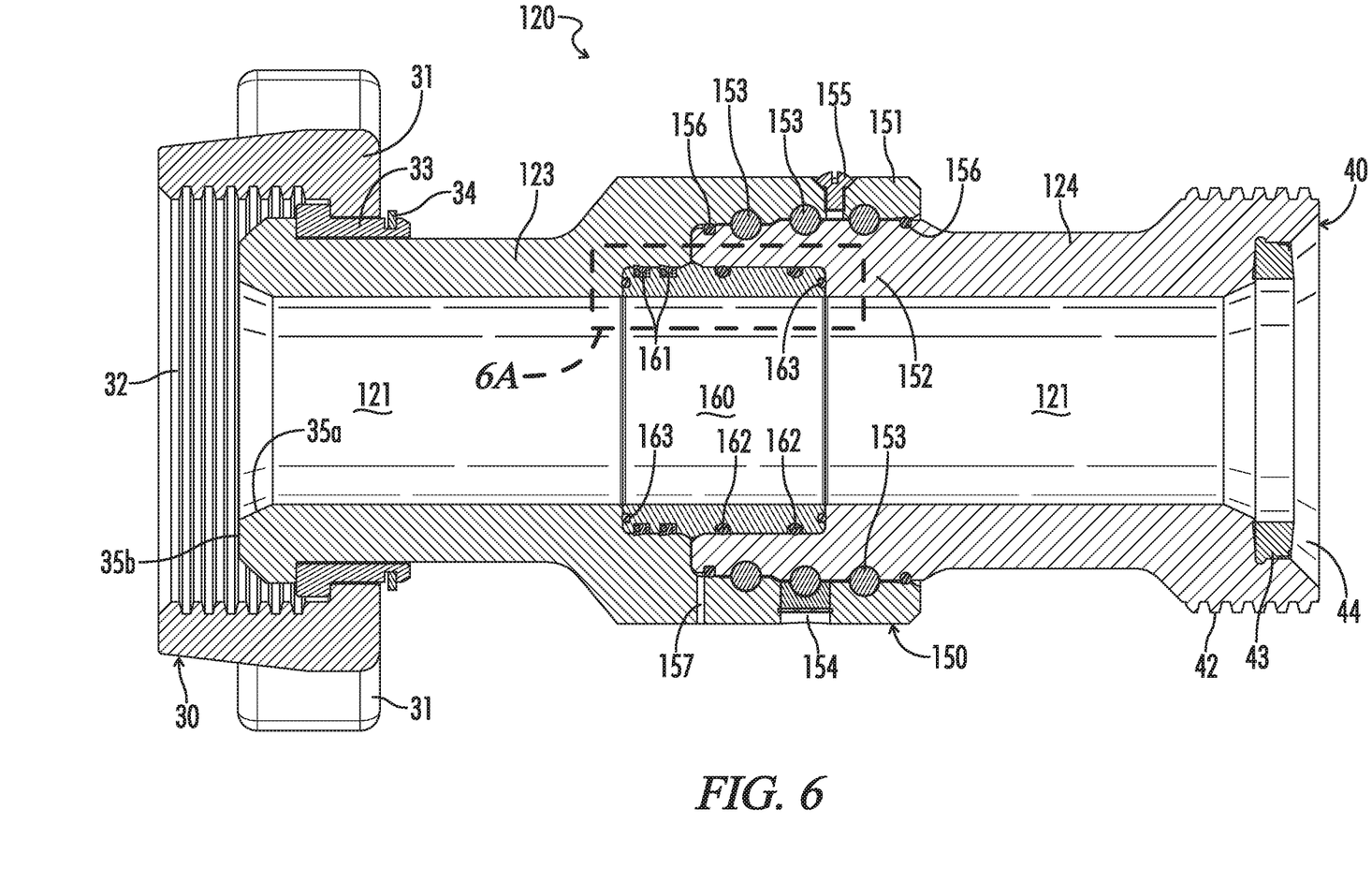
FIG. 6 is a cross-sectional view of swivel pup joint 120 shown in FIGS. 4-5.

For example, another preferred embodiment 120 of the novel swivel components, a swivel pup joint or simply swivel pup, is shown in FIGS. 4-6. Swivel pup 120 has a central passage 121 extending along its main axis and generally comprises a pair of tubular subs, female sub 123 and male sub 124, and novel swivel joint 150. Swivel joint 150 allows female sub 123 and male sub 124 to rotate relative to each other about the main axis.

Swivel pup 120 is adapted for assembly into a flow line of systems such as the frac systems shown in FIG. 1. Thus, each sub 123/124 preferably is provided with a connection that allows swivel pup 120 to be easily and reliably assembled into a high-pressure flowline. For example, swivel pup 120 is provided with hammer union connections that will allow it to be quickly and easily made up or broken down from the system. More particularly, a male hammer union connection 30 is provided at a connection end of female sub 123 and a female hammer union connection 40 is provide at a connection end of male sub 124.

Male hammer union connection 30 comprises an annular lug nut 31 having internal threads 32. Lug nut 31 is mounted on the connection end of female sub 123 by a plurality of retainer segments 33. Retainer segments 33 are arranged side-by-side and circumferentially around the connection end. They are secured with a snap ring 34 and may be viewed collectively as a segmented, shouldered collar. The collar retains lug nut 31 on female sub 23 and transfers axial load from lug nut 31 to bearing surfaces 35*a* and 35*b* on the terminus of the connection end. Female hammer union connection 40 has external threads 42 and a beveled bearing surface 45 on an enlarged portion of the connection end of male sub 124. An annular, elastomeric seal 43 is carried in an annular rabbet situated radially inward of bearing surface 45.

Thus, swivel pup 120 may be made up and broken down from flow lines via hammer unions with other flowline components. Lug nut 31 of female sub 123 may be threaded on to a female hammer union connection of another flowline component, or vice versa. Inner threads 32 on lug nut 31 will engage outer threads on the female hammer union connection of the other component. Once male hammer union connection 30 of swivel pup 120 initially contacts the female hammer union connection of the other component, further tightening of lug nut 31 will transfer axial load through retainer segments 33 to bearing surfaces 35 on the connection end of female sub 123. The elastomer seal in the female hammer union connection will be compressed by bearing surface 35*a* on female sub 123 to provide a hydraulic seal in the union.

The design and configuration of such hammer unions are well known in the art and will not be further described herein. Suffice it to say, however, that any conventional hammer union design may be incorporated into the novel swivel components. Swivel components may be provided with female hammer union connection on the female sub and with male hammer union connections on the male sub, or with either male or female connections on both the female and male subs. Likewise, the swivel components may be provided with connection ends that allow them to be made up and broken down by conventional clamp or flange unions, by threaded connections, or by any other conventional assembly methods.

Swivel joint 150 generally comprises a joint end 151 of female sub 123, a joint end 152 of male sub 124, a plurality of bearings 153, and a sleeve 160. As shown in FIGS. 5-6, joint ends 151/152 are provided with certain features that allow male joint end 152 to be received in female joint end 151 and to be rotationally coupled by bearings 153. More specifically, joint end 151 of female sub 123 is provided with first, second, and third areas of enlarged inner diameters (relative to the diameter of passage 121). Joint end 152 of male sub 124 is provided an area of enlarged outer diameter (relative to the outer diameter of the terminus of male joint end 124). Thus, male joint end 152 will fit closely within female joint end 151. The terminus of male joint end 152 will abut a shoulder extending radially between the first and second enlarged inner diameter portions of female joint end 151. The outer diameter of the terminus of male joint end 152 will conform generally to the second enlarged inner diameter portion of female joint end 151. The enlarged outer diameter portion of male joint end 152 will conform to the third enlarged diameter portion of female joint end 151.

Mating annular grooves are provided in female joint end 151 and male joint end 152. More particularly, a first, internal annular groove is provided in the second enlarged inner diameter portion of female joint end 151, and a first, external annular groove is provided in the male joint end 152. Each of those grooves has a substantially semicircular cross-section. When male joint end 152 is received in female joint end 151 the grooves will be in substantial alignment and cooperate to form a first bearing raceway extending all the way around the interface between male joint end 152 and female joint end 151.

Second and third pairs of mating annular grooves provide second and third bearing raceways. More particularly, second and third internal annular grooves are provided in the third enlarged inner diameter portion of female joint end 151. Second and third external annular grooves are provided in the enlarged outer diameter portion of male joint end 152. Like the grooves forming the first bearing raceway, those grooves have a substantially semicircular cross-section and will be substantially aligned when male joint end 152 is received in female joint end 151.

Bearings 153 may be loaded into the raceways via access ports. More specifically, female joint end 151 is provided with three access ports, one for each raceway. Bearings may be loaded into the raceways through the ports, which then may be closed by a plug, such as a rubber plug 154 secured within the port by a retainer ring. Once loaded into the raceways, bearings 153 provide a rotatable coupling between female joint end 151 and male joint end 152. Bearings 153 allow joint ends 151/152 to rotate relative to each other, while at the same time preventing them from separating.

A port also is provided to allow grease to be introduced into bearings 153 and the raceway area. The grease port is normally closed, for example, by a screw 155. Grease seals 156 also preferably are provided between female joint end 151 and male joint end 152 to help seal grease within the raceway area. Grease seals 156 typically will be lightly compressed elastomeric O-rings, but other sealing rings, such as elastomeric square cut, lobed, or cup style rings may be used.

It will be noted that the first bearing raceway is offset not only axially, but also radially from the second and third bearing raceways. Offsetting the bearing raceways radially allows stress to be distributed more widely through joint end 151 of female sub 123. It also will be appreciated that the bearing access ports and the grease port preferably will be arrayed angularly about the central axis with more or less equal angular separation. That also will help distribute stress through female joint end 151. Joint ends 151/152 of female sub 123 and male sub 124, the bearing raceways, and the various ports, however, may be configured in various conventional ways as desired. For example, the bearing raceways may be in radial alignment, or each one may be offset radially from the other as disclosed, for example, in U.S. Pat. No. 6,164,707 to T. Ungchusri et al.

As noted, however, the novel swivel joints also comprise a replaceable sleeve. For example, swivel joint 150 comprises sleeve 160. As may be seen in FIGS. 5-6, sleeve 160 has a generally open cylindrical shape. It fits within the first enlarged inner diameter portion of female joint end 151 and an enlarged inner diameter portion of male joint end 152. Sleeve 160 thus extends across joint ends 151/152, spanning the annular, radially extending abutment between the terminus of male joint end 152 and the shoulder in female joint end 151.

Various elastomeric seals are provided between sleeve 160, female joint end 151, and male joint end 152 that will effectively, reliably, and robustly isolate joint 150 from pressure within conduit 121 of swivel pup 120. Preferably, as described further below, the seals and clearances between sleeve 160 and joint ends 151/152 also will be coordinated such that female joint end 151 rotates preferentially around sleeve 160, while male joint end 152 remains stationary relative to sleeve 160.

More particularly, pressure seals 161, pressure seals 162, and debris seals 163 are mounted between sleeve 160 and joint ends 151/152. Pressure seals 161 are radial seals that are mounted between the outer diameter of sleeve 160 and the first enlarged inner diameter portion of female joint end 151. Pressure seals 161 are adapted to isolate hydraulic pressure within swivel pup 120 and to prevent flow of fluids around sleeve 160. They preferably are mounted in an outer annular groove or "gland" extending around sleeve 160, but may be mounted in an inner gland in female joint end 151 or in other conventional ways. It will be noted that two pressure seals 161 preferably are provided between sleeve 160 and female joint end 151. Inner, secondary seal 161 is mounted on the low-pressure side of outer, primary seal 161 and provides redundancy in the event outer seal 161 fails. Additional seals may be provided, however, or a single seal may be used if desired.

While other conventional pressure seals may be used in their stead, seals 161 preferably are dynamic seals adapted to tolerate rotation of female joint end 151 around sleeve 160. That is, when sleeve 160 is installed within female joint end 151, seals 161 and their corresponding glands are sized and configured such that seals 161 will be squeezed radially or preloaded relatively lightly. Seals 161 will exert relatively little, expansive force radially outward against female joint end 151. Thus, female joint end 151 may rotate relatively easily around sleeve 160, for example, when swivel pup 120 is being assembled into a flow line. Moreover, rotation of female joint end 151 will cause relatively little stress and wear in pressure seals 161.

Rotary pressure seals 161 may be any of a number of conventional elastomeric seal ring designs, such as the many conventional variations of cup-style and squeeze rings. Typically, the rings will be fabricated from elastomers such as nitrile butadiene rubber (NBR), hydrogenated nitrile butadiene nitrile rubber (HNBR), fluoroelastomers such as Viton® and Dyneon™, and tetrafluoroethylene propylene rubbers, such as Aflas™, polyurethane, and fluorosilicone. The choice of materials will be driven by conventional considerations, most commonly the nature of the fluids, the temperatures, and the pressures to which the seals will be exposed. For example, fluoroelastomers may be preferred for oily and corrosive fluids, and harder nitrile and polyester rubbers may be preferred for higher pressure seals.

Cup-style and squeeze rings function in similar ways. Both designs have annular lips. The lips extend radially inward and outward around the high-pressure side or face of the ring, that is, the side of the seal that is exposed to external pressure. The difference in the designs is that cup rings have an annular groove in the seal face. The lips exert relatively little sealing pressure until they are exposed to external pressure. External pressure, however, tends to force the lips to spread radially and conform to the sealing surfaces. Elastomeric materials behave under pressure as a highly viscous, incompressible fluid. Thus, increasing pressure on the face of the seal tends to increase the sealing force applied by the seal against the sealing surfaces.

The clearance between female joint end 151 and sleeve 160, however, is relatively large to accommodate rotation of female joint end 151. At higher pressures, the tensile moduli or "viscosity" of the seal may not be sufficiently high to prevent the elastomeric material from "flowing" into the gap. That extrusion of material into the gap can cause the seal to fail. Thus, for higher pressure applications, rotary pressure seals 161 preferably will have a design that is more resistant to extrusion, such as a loaded-cup design illustrated in the enlarged view of FIG. 6A.

Figure 6A:
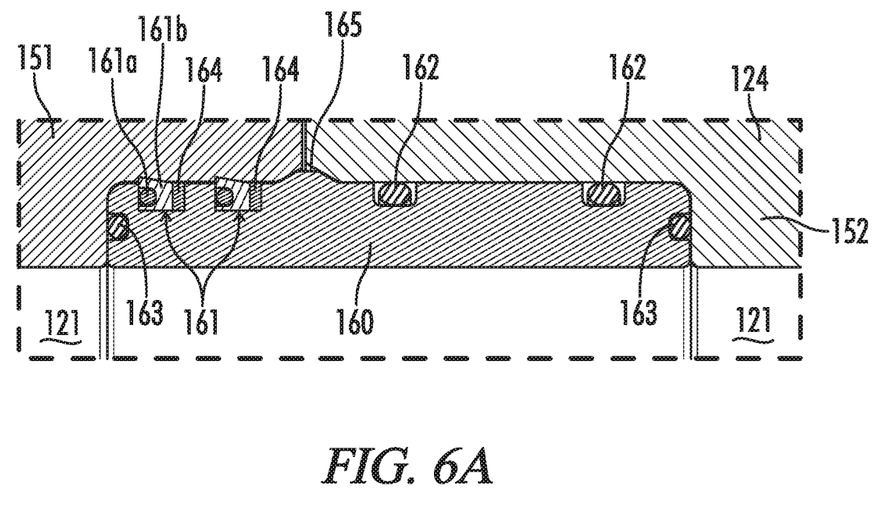
FIG. 6A is an enlarged cross-section view of a portion of swivel pup joint 120 taken from FIG. 6.

Loaded-cup seals 161 incorporate a base ring 161a fabricated from harder, somewhat less elastic, and less extrudable polymers such as a polyester, polyurethane, or polytetrafluoroethylene. Base ring 161a has an annular groove in its pressure face that forms a pair of annular sealing lips. An elastomer ring, such as an O-ring 161b, is mounted in the groove in base ring 161a. Elastomer ring 161b is fabricated from a softer, more elastic material, such as NBR, and is loaded in the groove under compression. It imparts a relatively low sealing pressure to the lips on base ring 161a when seal 161 is not exposed to external pressure. When exposed to external pressure, however, the pressure will be transmitted through elastomer O-ring 161b radially outward to lips on base ring 161a. The lips will expand and make further, pressurized contact against the inner surface of female sub 123. Because base ring 161a is fabricated is fabricated from harder, less extrudable materials, seal 161 is capable of withstanding much higher pressures than simple elastomer seals.

Rotary pressure seals 161 also may be provided with anti-extrusion, backup rings, such as backup rings 164. A best seen in the enlarged view of FIG. 6A, backup rings 164 are mounted in the seal gland immediately behind, that is, on the low-pressure side of rotary pressure seals 161. Backup rings 164 may be made of a hard material, such as steel, brass, and other metals, or from engineering plastics, such as polycarbonates, Nylon 6, Nylon 66, and other polyamides, including fiber reinforced polyamides such as Reny polyamide, polyether ether ketone (PEEK), and polyetherimides such as Ultem®. They also may be made of harder formulations of the same basic elastomer from which the seals are made. In any event, backup rings 164 are sized to extend across the clearance between sleeve 160 and female joint end 151, thus shutting off potential extrusion paths.

Many conventional rotary seal rings incorporate an integral backup ring designed to support and stabilize elastomeric sealing lips. They may be used instead of or in addition to separate backup rings. One common design for such seal rings is a two-component ring similar to loaded-cup designs. The integral seal/backup ring has a hard base ring and an elastomer ring. The elastomer ring is mounted forward, that is, on the high-pressure side of the ring and provides the face of the seal. It typically will be an elastomeric cup or squeeze ring. The back side of the elastomer ring has a lobe extending into a groove in the base ring. When exposed to pressure, as with other cup and squeeze seals, sealing lips on the elastomer ring will expand radially outward and inward. Pressure imparted through the elastomer seal and, in particular, through the elastomer lobe also will cause the groove on the base ring to spread in a controlled manner. The base ring thus will close any extrusion gaps behind the elastomer ring.

Pressure seals 162 are mounted between the outer diameter of sleeve 160 and the enlarged inner diameter portion of male joint end 152. Like pressure seals 161, pressure seals 162 are radial seals that are adapted to isolate hydraulic pressure within swivel pup 120. They may be mounted in any conventional manner, but also preferably are mounted in annular glands extending around sleeve 160. Two pressure seals 162 are provided between sleeve 160 and male joint end 152 to provide redundancy, but more or fewer seals 162 may be used if desired. In contrast to rotary pressure seals 161, pressure seals 162 preferably are static seals and are not designed to accommodate rotation. Pressure seals 162 are sized and configured such that when sleeve 160 is installed within male joint end 152 they are under relatively high compression.

When subject to rotational forces, therefore, static seals 162 also necessarily create more friction between sleeve 160 and male joint end 152 than the friction generated between rotary pressure seals 161 and sleeve 160. Male joint end 152 will be more resistant to rotation around sleeve 160 than female joint end 151. When female sub 123 and male sub 124 are rotated relative to each other during assembly of a flow line, female joint end 151 will rotate preferentially around sleeve 160. Thus, wear on static pressure seals 162 will be minimized in favor of the more wear resistant rotary pressure seals 161.

Static pressure seals 162 typically will be fabricated from the same type of elastomeric materials as are suitable for rotary pressure seals 161. Various conventional designs may be used, but more typically static pressure seals 162 will be elastomeric O-rings, square cut rings, or lobed rings. It also will be appreciated that the tolerance between the outer surface of sleeve 160 and the inner surface of male joint end 152 may be minimized and will be smaller than the tolerance provided for female joint end 151. Male joint end 152 is not required to rotate around sleeve 160. Thus, though they may be provided if desired, backup rings and the like typically will not be required for static pressure seals 162.

Once rotationally coupled, female sub 123 and male sub 124 will hold sleeve 160 in place. Preferably, sleeve 160 is provided with geometry that ensures that it will be properly installed in joint 150. For example, as seen best in FIG. 6A, sleeve 160 is provided with an annular boss 165 extending around its outer circumference. The sides of annular boss 165 are tapered. Boss 165 fits within mating beveled geometry provided at the terminus of male joint end 152 and the shoulder in female joint end 151. Thus, boss 165 serves as a locator ensuring that sleeve 165 will be installed in the proper orientation with rotary pressure seals 161 located in female sub 123 and static pressure seals 162 in male sub 124.

Debris seals 163 are face seals mounted between the face ends of sleeve 160 and shoulders in, respectively, female joint end 151 and male joint end 152. Though they may be, they need not be designed to isolate pressure within swivel pup 120. Preferably, they will be designed to allow ingress of fluids, but to reduce the ingress of debris into pressure seals 161 and 162. They may be mounted in any conventional manner, but preferably are mounted in annular glands extending around the faces of sleeve 160.

Debris seals 163 are sized and configured such that when sleeve 160 is installed they are under moderate compression. They typically will be fabricated from the same type of elastomeric materials as are suitable for pressure seals 161/162. Various conventional designs may be used, but more typically debris seals 163 will be elastomeric O-rings, square cut rings, or lobed rings.

Seals suitable for use in the novel swivel joints and components are commercially available from many manufacturers. Suitable rotary pressure seals include, depending on the application, X-Pac® loaded U-cup seals (VT90 FKM (Viton) available from Martin Fluid Power Company, Inc. (MFP Seals) (www.mfpseals.com); urethane loaded lip seals available from Power Supply Components (powersupplyseals.com), and H2155 Hytrel®/N6014 NBR polyseals available from MFP Seals. Suitable static pressure seals and debris seals include Viton, HNBR, and Buna O-rings available from Parker Hannifin Corp. (www.parker.com). Workers in the art will be able to select an appropriate seal and design a corresponding gland in accordance with conventional design criteria.

Preferably, the novel swivel components will be fabricated for use in high-pressure flow lines. For example, they typically will be rated for 10,000 psi service or higher, such as 15,000 psi. It will be appreciated that swivel joint 150 and other embodiments of the novel joints, offer many significant advantages over prior art designs especially in the context of such high-pressure applications. Most importantly, it is expected that the novel swivel components will have a substantially longer service life even under harsh high-pressure, high flowrate conditions.

In general, the novel swivel joints may be fabricated by methods and from materials commonly used in manufacturing flow iron components. Given the extreme stress, and the corrosive and abrasive fluids to which flowline components are exposed, especially those designed for high-pressure, high-velocity flow lines, suitable materials will be hard and strong. For example, the female and male subs of the novel swivel joints may be fabricated from 4130 and 4140 chromoly steel or from somewhat harder, stronger steel such as 4130M7, high end nickel alloys, and stainless steel. The components may be made by any number of conventional techniques, but typically and in large part will be made by forging a blank part and then machining the required features into the part. Suitable bearings and, as noted, seals are widely available from a number of manufacturers.

Sleeve 160, however, preferably will be fabricated from more metal alloys that are more resistant to corrosion and erosion than the harder, stronger steels typically used to make female sub 123 and male sub 124. For example, sleeve 160 may be made from a more wear resistant alloys, such as nitride 17-4 stainless steel. Other alloys that are more wear resistant than the steels from which the components are typically made include tungsten carbide steel alloys, borided steel, carburized steel, other grades of stainless steel, superalloys such as Inconel and Stellite, and diamond coated steel.

Flow through conventional swivel joints, such as joint 50 in conventional swivel pup 20, can be quite turbulent. Turbulence can exacerbate both corrosive and erosive wear in face seals 58, the seal rabbet, and adjacent metal surfaces. Wear in those components will increase turbulence, thus accelerating the cycle. Sleeve 160, however, provides conduit 121 with a smooth uniform bore through swivel joint 150 with tight, metal-to-metal seams. Flow though the joint will be more laminar and less erosive.

It also will be appreciated that seal 58 in swivel pup 20 and other conventional designs, is directly exposed to flow when the component is in service. Since it is fabricated from relatively soft, elastomeric materials, particulates in a fluid can work their way into seal 58. Seal 58 also can wear rapidly to the point where is incapable of holding the rated pressure. Pressure seals 161/162 in swivel joint 150, however, are protected from flow through conduit 121. Given its radial thickness, the tight, metal-to-metal abutment between the faces of sleeve 160 and female/male subs 151/152, combined with debris seals 163, significantly reduce the amount of particulate matter that can work its way toward pressure seals 161/162.

Moreover, the axial length of sleeve 160 allows for redundant seals. If a leak develops around an outer pressure seal 161/162, its inner seal 161/162 will back up the leak. The outer pressure seals 161/162, even if incapable of holding pressure, still will protect the redundant seals 161/162 from debris. Thus, other factors being equal, it is expected that swivel joint 150 will be able to remain in service for significantly longer periods of time before fluid is able to leak through joint 150.

It also is expected that pressure seals 161/162 will experience less wear as swivel pup 120 is being made up or broken down from a flow line. Pressure seals 161, because they are rotary seals, are much more tolerant of rotation than static seals 162. While static seals 162 would be subject to stress and wear if subjected to rotational forces, male sub 124 does not rotate around sleeve 160. When rotational forces are applied to female/male subs 123/124, rotation occurs preferentially between female sub 123 and sleeve 160. In contrast, when conventional swivel joint 20 is assembled, seal 58 is put under compression. Relative rotation of subs 23/24, therefore, creates stress and eventually wear in seal 58.

Moreover, thermal contraction of female/male subs 23/24 while conventional swivel pup 20 is in service reduces compressive, axial pressure on face seal 58. That will reduce the sealing capacity of seal 58, potentially increasing wear of seal 58 and surrounding metal areas even if a seal is maintained. Thermal expansion will increase the compressive forces on seal 58 and render any rotation over seal 58 more damaging. Because pressure seals 161/162 are mounted around sleeve 160, however, they will be less affected by thermal expansion and any attendant problems.

Moreover, by mounting pressure seals 161/162 around sleeve 160, a seal is more likely to be maintained even if there is significant wear in bearings 153 or their raceways. In conventional swivel pup 20, as bearings 53 and the raceways wear, female sub 23 and male sub 24 tend to separate. As they separate, there is less axial, compressive force on seal 58. Even is a seal is not lost, seal 58 and adjacent metal areas will be subject to increased wear. Any reduction of axial forces between female sub 123 and male sub 124 in swivel pup 120 will not affect the ability of pressure seals 161/162 to establish an effective seal, nor will it subject them to increased wear.

It also will be appreciated that sleeve 160 can help reduce wear in bearings 153 and the raceways. That is, and not just during makeup and breakdown, swivel components can be subject to bending or side loads that can induce stress in the swivel components. Under high-flow and high-pressure service, such as is common in fracking operations, flowlines will experience considerable vibration. Those vibrations will create significant, cyclical stress and bending through swivel joints that can exacerbate wear in the bearings and raceways. Embodiments of the novel swivel joints, however, are significantly better at distributing such stress. For example, sleeve 160 extends a substantial distance across the abutment of female sub 123 and male sub 124. It will improve the concentricity of the joint and reinforce it against bending and side loads.

Finally, novel sleeves 160 will provide easier and more effective rebuilding and reconditioning of swivel component 120. By mounting all seals 161/162/163 on sleeve 160, a seal package is provided. All seals may be replaced quickly and easily simply by replacing sleeve 160. Moreover, upon replacement of sleeve 160, even if they are not mounted thereon, replacement seals 161/162/163 will be provided with fresh, smooth sealing surfaces. In conventional swivel pup 20, if seal 58 is worn, it is likely that adjacent metal areas will have experienced wear as well. At some point, it may be necessary to machine and enlarge the seal rabbet to provide a replacement seal 58 with an effective sealing surface. Other surfaces near the seal or through the joint interface also may have to be machined, or the component scrapped. The sleeve in the novel joints, however, will absorb most of the wear in the joint area. If it wears to an unacceptable degree, the sleeve can be replaced, and machining or otherwise reconditioning the subs can be minimized or eliminated.

While swivel joint 150 has been exemplified in the context of swivel component 102 and swivel pup 120, the novel swivel joints may be incorporated in any otherwise conventional swivel component. Swivel component 102 in particular may be a very common application. The novel swivel joints, however, may be used to assemble, in any desired combination, straight, elbow, tee, cross, lateral, wye, and adaptor subs used to combine or split flow or to alter the course of a flowline. They may be used to assemble subs of other flowline components, such as valves and other control devices, meters, gauges, and other monitoring equipment, and larger equipment, such as manifolds. As illustrated, swivel pup 120 also appears relatively short. Swivel pups 120 may be of any length, but typically will be quite long, much longer than they appear in the figures. The novel swivel components also may be manufactured in any conventional size and with any conventional connections.

Likewise, the novel swivel joints have been described in the context of frac systems. While frac systems in particular and the oil and gas industry in general rely heavily on temporary flow lines, the novel swivel joints are not limited to such applications or industries. Suffice it to say that the novel swivel joints and swivel components have wide applicability wherever conventional swivel components have been conventionally applied.

While this invention has been disclosed and discussed primarily in terms of specific embodiments thereof, it is not intended to be limited thereto. Other modifications and embodiments will be apparent to the worker in the art.

What is claimed is:

1. A swivel joint for a high-pressure flow line, said swivel joint comprising:
   (a) a male sub rotationally coupled to a female sub at, respective, generally tubular joint ends thereof having a passage extending therethrough;
   (b) said male joint end having:
      i) an enlarged inner diameter portion of said passage, and
      ii) an outer annular groove;
   (c) said female joint end having:
      i) an enlarged inner diameter portion of said passage, and
      ii) an inner annular groove;
   (d) said male joint end received in said female joint end such that said male joint end groove and said female joint end groove are aligned to provide an annular race;
   (e) a plurality of ball bearings received in said race, said bearings providing said rotational coupling between said male sub and said female sub;
   (f) a replaceable sleeve received in said enlarged inner diameter portions of said male joint end and said female joint end;

(g) a first pressure seal ring mounted between said replaceable sleeve and said enlarged diameter portion of said male joint end; and (h) a second pressure seal ring mounted between said replaceable sleeve and said enlarged diameter portion of said female joint end;

(i) wherein one of said first and second pressure seal rings is a radial rotary seal and the other of said first and second pressure seal rings is a radial static seal;

(j) wherein the friction generated by said radial rotary seal between said replaceable sleeve and the one of said male end and said female end on which it is mounted is less than the friction generated by said radial static seal between said replaceable sleeve and the one of said male end and said female end on which it is mounted;

(k) whereby the one of said male end and said female end having the radial rotary seal will rotate preferentially about said replaceable sleeve.

2. The swivel joint of claim 1, where said swivel joint comprises:
   (a) a debris seal ring mounted between said replaceable sleeve and said enlarged diameter portion of said male joint end; and
   (b) a debris seal ring mounted between said replaceable sleeve and said enlarged diameter portion of said female joint end.

3. The swivel joint of claim 1, wherein said pressure seal rings are radial seals mounted between the outer circumference of said replaceable sleeve and the inner circumference of said enlarged diameter portions.

4. The swivel joint of claim 3, wherein said pressure seal rings are mounted in annular glands extending around the outer circumference of said replaceable sleeve.

5. The swivel joint of claim 2, wherein said debris seal rings are face seals spaced radially inward from said passage.

6. The swivel joint of claim 5, wherein said debris seal rings are mounted in annular glands extending around faces of said replaceable sleeve.

7. The swivel joint of claim 1, wherein said rotary seal ring is a u-cup seal.

8. The swivel joint of claim 1, wherein said swivel joint comprises an anti-extrusion backup ring mounted behind and abutting said rotary seal ring.

9. The swivel joint of claim 8, wherein said anti-extrusion backup ring is integral with said rotary seal ring.

10. The swivel joint of claim 1, wherein said swivel joint comprises:
    (a) a pair of said first pressure seals; and
    (b) a pair of said second pressure seals.

11. The swivel joint of claim 1, wherein said sleeve is fabricated from a more wear resistant steel than the steel from which said male and female subs are fabricated.

12. A swivel flowline component comprising a swivel joint of claim 1.

13. A high-pressure flow line comprising the swivel component of claim 12.

14. The flow line of claim 13, wherein said flow line is incorporated into a system for fracturing a well.

15. A method of coupling first and second flowline components, said method comprising assembling a swivel joint of claim 1 between said first and second flowline components.

16. A swivel joint for a high-pressure flow line, said swivel joint comprising:

(a) a male sub rotationally coupled to a female sub at, respectively, generally tubular joint ends thereof having a passage extending therethrough;

(b) said male joint end having:
   i) an enlarged inner diameter portion of said passage, and
   ii) an outer annular groove;

(c) said female joint end having:
   i) an enlarged inner diameter portion of said passage, and
   ii) an inner annular groove;

(d) said male joint end received in said female joint end such that said male joint end groove and said female joint end groove are aligned to provide an annular race;

(e) a plurality of ball bearings received in said race, said bearings providing said rotational coupling between said male sub and said female sub;

(f) a replaceable sleeve received in said enlarged inner diameter portions of said male joint end and said female joint end;

(g) a first pressure seal ring mounted between said replaceable sleeve and said enlarged diameter portion of said male joint end; and (h) a second pressure seal ring mounted between said replaceable sleeve and said enlarged diameter portion of said female joint end;

(i) wherein said first and second pressure seals are mounted between the outer circumference of said replaceable sleeve and the inner circumference of said enlarged diameter portions in annular glands spaced axially inward from the ends of said replaceable sleeve; and (j) one of said first and second pressure seal rings is a radial rotary seal and the other of said first and second pressure seal rings is a radial static seal.

17. A swivel joint for a high-pressure flow line, said swivel joint comprising:

(a) a male sub rotationally coupled to a female sub at, respectively, generally tubular joint ends thereof having a passage extending therethrough;

(b) said male joint end having:
   i) an enlarged inner diameter portion of said passage, and
   ii) an outer annular groove;

(c) said female joint end having:
   i) an enlarged inner diameter portion of said passage, and
   ii) an inner annular groove;

(d) said male joint end received in said female joint end such that said male joint end groove and said female joint end groove are aligned to provide an annular race;

(e) a plurality of ball bearings received in said race, said bearings providing said rotational coupling between said male sub and said female sub;

(f) a replaceable sleeve received in said enlarged inner diameter portions of said male joint end and said female joint end;

(g) a first pressure seal ring mounted between said replaceable sleeve and said enlarged diameter portion of said male joint end;

(h) a second pressure seal ring mounted between said replaceable sleeve and said enlarged diameter portion of said female joint end;

(i) a first debris face seal ring mounted between said replaceable sleeve and said enlarged diameter portion of said male joint end; and (j) a second debris face seal ring mounted between said replaceable sleeve and said enlarged diameter portion of said female joint end;

(k) wherein said first and second debris face seal rings are spaced radially outward from said passage and allow ingress of fluids and reduce ingress of debris into, respectively, said first and second pressure seal rings.

18. A swivel joint for a high-pressure flow line, said swivel joint comprising:

(a) a male sub rotationally coupled to a female sub at, respective, generally tubular joint ends thereof having a passage extending therethrough;

(b) said male joint end having:
  i) an enlarged inner diameter portion of said passage, and
  ii) an outer annular groove;

(c) said female joint end having:
  i) an enlarged inner diameter portion of said passage, and
  ii) an inner annular groove;

(d) said male joint end received in said female joint end such that said male joint end groove and said female joint end groove are aligned to provide an annular race;

(e) a plurality of ball bearings received in said race, said bearings providing said rotational coupling between said male sub and said female sub;

(f) a replaceable sleeve received in said enlarged inner diameter portions of said male joint end and said female joint end;

(g) a first pressure seal ring mounted between said replaceable sleeve and said enlarged diameter portion of said male joint end; and (h) a second pressure seal ring mounted between said replaceable sleeve and said enlarged diameter portion of said female joint end;

(i) wherein at least one of said first and second pressure seal rings is a rotary seal and said swivel joint comprises an anti-extrusion backup ring mounted behind and abutting said rotary seal ring.

19. The swivel joint of claim 16, wherein said pressure seal rings are mounted in annular glands extending around the outer circumference of said replaceable sleeve.

20. The swivel joint of claim 16, where said swivel joint comprises:

(a) a debris seal ring mounted between said replaceable sleeve and said enlarged diameter portion of said male joint end; and (b) a debris seal ring mounted between said replaceable sleeve and said enlarged diameter portion of said female joint end.

21. The swivel joint of claim 20, wherein said debris seal rings are mounted in annular glands extending around faces of said replaceable sleeve.

22. The swivel joint of claim 16, wherein said swivel joint comprises an anti-extrusion backup ring mounted behind and abutting said rotary seal ring.

23. A swivel flowline component comprising a swivel joint of claim 16.

24. A high-pressure flow line comprising the swivel component of claim 23.

25. The flow line of claim 24, wherein said flow line is incorporated into a system for fracturing a well.

26. The swivel joint of claim 17, wherein said pressure seal rings are radial seals mounted in annular glands extending around the outer circumference of said replaceable sleeve.

27. The swivel joint of claim 17, wherein at least one of said first and second pressure seal rings is a rotary seal.

28. The swivel joint of claim 17, wherein said debris seal rings are mounted in annular glands extending around faces of said replaceable sleeve.

29. The swivel joint of claim 27, wherein said swivel joint comprises an anti-extrusion backup ring mounted behind and abutting said rotary seal ring.

30. A swivel flowline component comprising a swivel joint of claim 17.

31. A high-pressure flow line comprising the swivel component of claim 30.

32. The flow line of claim 31, wherein said flow line is incorporated into a system for fracturing a well.

33. The swivel joint of claim 18, wherein said anti-extrusion backup ring is integral with said rotary seal ring.

34. The swivel joint of claim 18, wherein said pressure seal rings are radial seals mounted in annular glands extending around the outer circumference of said replaceable sleeve.

35. A swivel flowline component comprising a swivel joint of claim 18.

36. A high-pressure flow line comprising the swivel component of claim 35.

37. The flow line of claim 36, wherein said flow line is incorporated into a system for fracturing a well.

\* \* \* \* \*